United States Patent
Nguyen

[19]

[11] Patent Number: 5,931,931
[45] Date of Patent: Aug. 3, 1999

[54] METHOD FOR BUS ARBITRATION IN A MULTIPROCESSOR SYSTEM

[75] Inventor: Thang Quang Nguyen, Cedar Park, Tex.

[73] Assignee: International Business Machines Corporation, Armonk, N.Y.

[21] Appl. No.: 08/835,132

[22] Filed: Apr. 4, 1997

[51] Int. Cl.[6] .................................................. G06F 13/14
[52] U.S. Cl. ......................... 710/113; 710/109; 710/111; 710/115; 710/116; 710/122; 710/123
[58] Field of Search ........................... 364/242.92, 242.6, 364/230, 230.1; 395/289, 291, 295; 710/109, 111, 115, 113, 116, 122, 123

[56] References Cited

U.S. PATENT DOCUMENTS

| | | |
|---|---|---|
| 4,536,839 | 8/1985 | Shah et al. . |
| 4,814,974 | 3/1989 | Narayanan et al. . |
| 4,949,247 | 8/1990 | Stephenson et al. . |
| 5,088,024 | 2/1992 | Vernon et al. ........................... 395/725 |
| 5,265,212 | 11/1993 | Bruce, II . |
| 5,301,333 | 4/1994 | Lee . |
| 5,357,512 | 10/1994 | Khaira et al. . |
| 5,367,679 | 11/1994 | Khaira . |
| 5,440,713 | 8/1995 | Lin et al. . |
| 5,459,840 | 10/1995 | Isfeld et al. . |
| 5,634,060 | 5/1997 | Jennings ................................... 395/729 |
| 5,680,554 | 10/1997 | Baek ....................................... 395/287 |
| 5,715,475 | 2/1998 | Munson et al. ........................ 395/830 |

*Primary Examiner*—Ayaz R. Sheikh
*Assistant Examiner*—Frantz Blanchard Jean
*Attorney, Agent, or Firm*—Volel Emile; Andrew J. Dillon

[57] ABSTRACT

One aspect of the invention relates to a method for arbitrating simultaneous bus requests in a multiprocessor system having a plurality of devices which are coupled to a shared bus. In one version of the invention, the method includes the steps of receiving a plurality of bus requests from the devices; determining a device having the highest priority; determining whether the device having the highest priority is requesting the bus; granting bus access to the device having the highest priority if the device having the highest priority is requesting the bus; sequentially searching, beginning from the device logically adjacent to the device having the highest priority, for a next requesting device, and granting bus access to the next requesting device if the device having the highest priority is not requesting the bus; and assigning the highest priority to the device logically adjacent to the next requesting device.

10 Claims, 5 Drawing Sheets

FIG. 4
| DEVICES REQUESTING | CURRENT PRIORITY | DEVICE SERVED | NEXT PRIORITY |
|---|---|---|---|
| 400 — A,B,C,D | A | A | B |
| 402 — A,C,D | B | C | D |
| 404 — B,E | D | E | A |
| 406 — D | A | D | E |
| 408 — E | A | E | A |
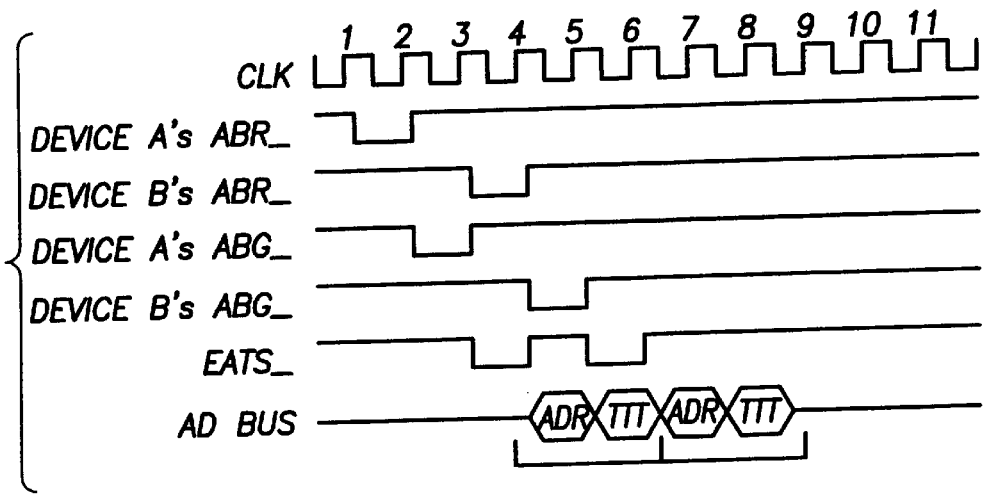
FIG. 5A
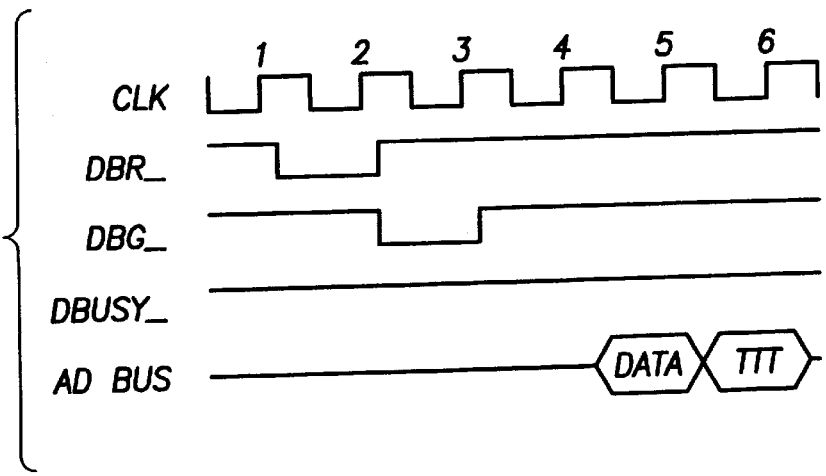
FIG. 5B

METHOD FOR BUS ARBITRATION IN A MULTIPROCESSOR SYSTEM

TECHNICAL FIELD

This invention relates generally to the field of multiprocessor computer systems, and more particularly, to techniques for performing bus arbitration between multiple devices which request control of a common address or data bus.

BACKGROUND OF THE INVENTION

Multiprocessor computing systems are being increasingly used in applications which require a large amount of computing capacity. Many types of multiprocessor systems exist, but in general, such systems are characterized by a number of independently running processors which are coupled together over a common bus in order to facilitate the sharing of resources between the processors. Of course, since the bus is common to all processors, and each processor is running independently, it is common for more than one processor to attempt to access the bus at the same time, i.e., the same clock cycle. If more than one processor were to gain control of the bus, then it is likely that data collision from the bus would occur.

Accordingly, it is important that a multiprocessor computer system have the ability to arbitrate simultaneous requests for the bus. Normally, this is performed by assigning priority to one of the requesting processors and allowing it to perform its access. A device which is attempting to gain control of the bus, or which actually controls the bus is sometimes referred to as a "bus master". After the bus master accesses the bus, its priority is removed and passed to another processor requiring access to the bus.

There are numerous ways in which priority can be assigned between the various processors coupled to the bus. However, it is important that the arbitration scheme allow all processors an opportunity to access the bus. Otherwise, repeated accesses by one processor could prevent another processor from obtaining control of the bus and thereby cause impermissible bus latencies in the data stream of the other processors. Accordingly, it is an object of the present invention to provide a bus arbitration method which allows all processors a fair opportunity to access the shared bus. Additional objects and advantages of the present invention will become apparent in view of the following disclosure.

SUMMARY OF THE INVENTION

One aspect of the invention relates to an apparatus for arbitrating simultaneous bus requests in a multiprocessor system having a plurality of devices which are coupled to a shared bus. In one embodiment, the apparatus comprises a means for receiving a plurality of bus requests from the devices; a means for determining a device having the highest priority; a means for determining whether the device having the highest priority is requesting the bus; a means for granting bus access to the device having the highest priority if the device having the highest priority is requesting the bus; a means for sequentially searching, beginning from the device logically adjacent to the device having the highest priority, for a next requesting device, and granting bus access to the next requesting device if the device having the highest priority is not requesting the bus; and a means for assigning the highest priority to the device logically adjacent to the next requesting device.

Another aspect of the invention relates to a method for arbitrating simultaneous bus requests in a multiprocessor system having a plurality of devices which are coupled to a shared bus. In one embodiment, the method comprises the steps of receiving a plurality of bus requests from the devices; determining a device having the highest priority; determining whether the device having the highest priority is requesting the bus; granting bus access to the device having the highest priority if the device having the highest priority is requesting the bus; sequentially searching, beginning from the device logically adjacent to the device having the highest priority, for a next requesting device, and granting bus access to the next requesting device if the device having the highest priority is not requesting the bus; and assigning the highest priority to the device logically adjacent to the next requesting device.

BRIEF DESCRIPTION OF THE DRAWINGS

FIG. 4 is a table illustrating the operation of an arbiter on a plurality of requesting devices according to an embodiment of the invention.

FIGS. 5A–5D are timing diagrams illustrating the operation of the arbiter and granting access to a common bus according to an embodiment of the invention.

DETAILED DESCRIPTION OF EMBODIMENTS OF THE INVENTION

One embodiment of the present invention will be described with respect to the exemplary 6XX-MX I/O bus, available from IBM for use in the "PowerPC" Architecture, and described in detail in the publication "PowerPC 6XX-MX I/O Bus Description", also available from IBM. Of course, it is to be understood that the present invention is adaptable to a wide variety of other systems as a matter of design choice.

Figure 1:
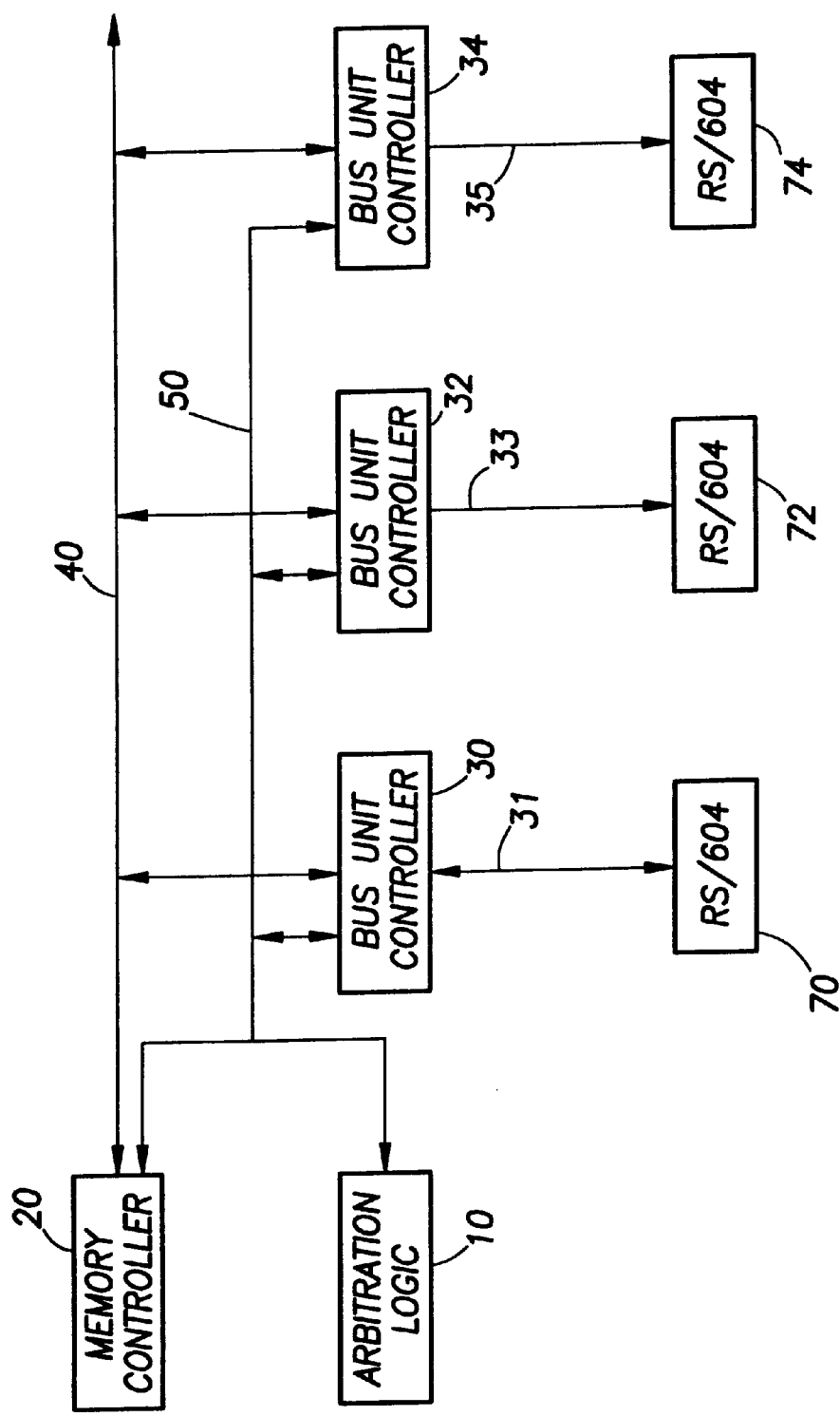
FIG. 1 is a block diagram of a multiprocessor system having arbitration logic according to an embodiment of the invention.

Referring now to FIG. 1, there is shown a block diagram of a system according to an embodiment of the invention. As illustrated, the system comprises a number of processing devices 70, 72 and 74, which are coupled to bus unit controllers ("BUCs") 30, 32 and 34, respectively. Examples of processing devices 70, 72 and 74 include workstations and other devices which require access to shared system memory. For purposes of illustration, devices 70, 72 and 74 are illustrated as IBM RS 604 Workstations. The workstations are coupled to the BUCs by IBM PCI buses 31, 33 and 35, respectively. The bus unit controllers allow communication between the workstations and the memory controller 20 across the 6XX-MX I/O bus 40. The memory controlled by memory controller 20 is accessible by request signals from the workstations. Arbitration logic 10, also referred to as the arbiter, arbitrates requests from the BUCs by issuing arbitration signals to the bus unit controllers through arbitration signal bus 50.

Figure 2:
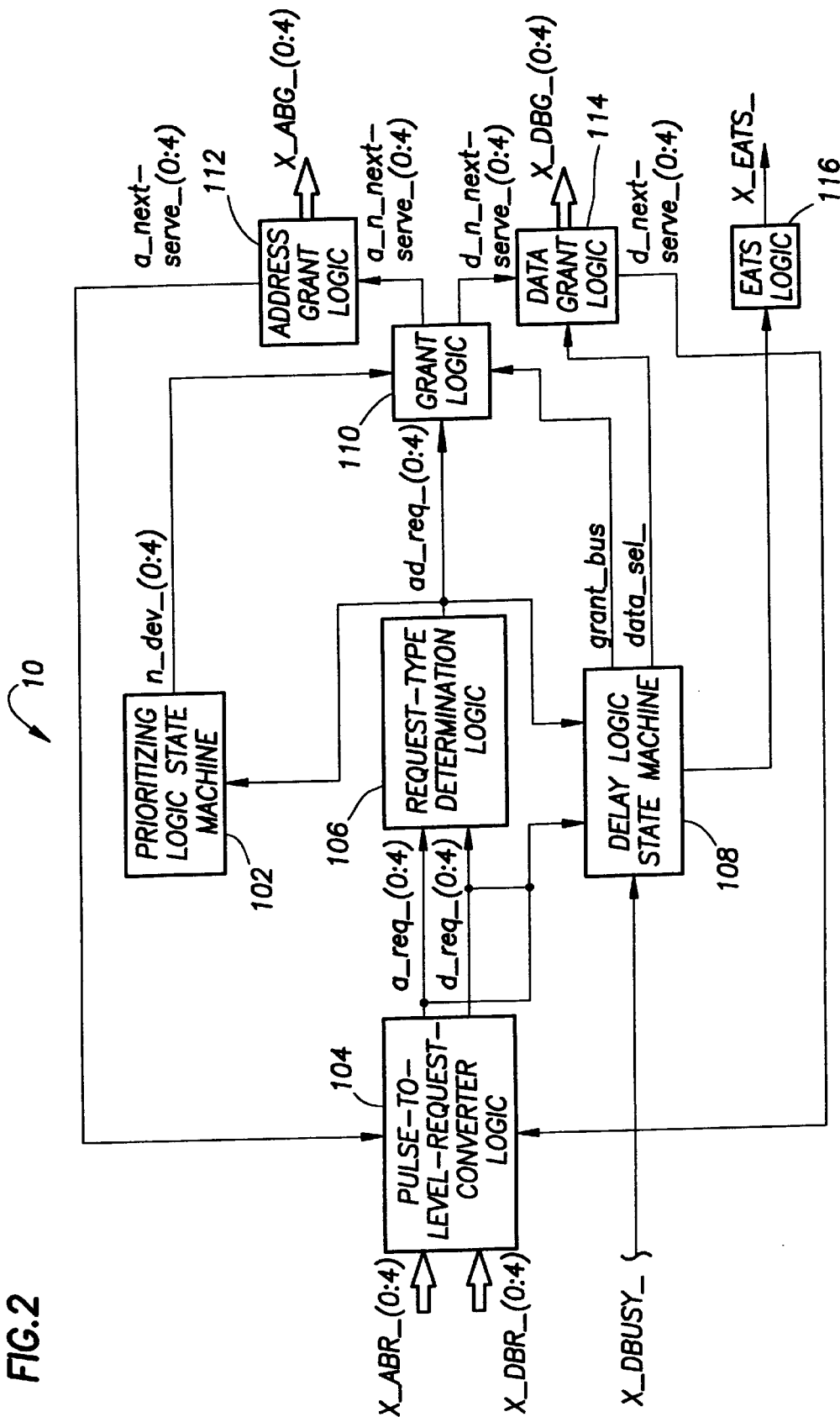
FIG. 2 is a block diagram of an arbiter according to an embodiment of the invention.

Referring now to FIG. 2, there is shown a block diagram of arbitration logic 10 according to an embodiment of the invention. Arbitration logic 10 comprises pulse-to-level request converter logic 104 which receives pulsed address and data bus request signals from the bus unit controllers and converts the request signals to level signals for use by the other logic blocks and the arbitration circuit. The bus unit controllers (not shown) request bus arbitration from arbitration logic 10 by providing request signals to pulse-to-level request converter logic 104. There are two request signals, the address bus request ("ABR_") and the data bus request ("DBR_"). In the embodiment shown, there are 5 BUCs logically numbered 0–4, attached to the arbitration logic 10. These are point-point signals to the arbitration logic 10 from the bus master. In the embodiment illustrated, the address bus can be arbitrated independently from the data bus, thus allowing true split transactions. Accordingly, data bus masters need only provide DBR_.

Once the request has been converted, they are then passed to request determination logic 106 which determines the type of bus request. In the illustrated embodiment, arbitration requests can be of three types: Address, Data, and Address-Data. The arbitration requests will be described in greater detail further herein. According to the PowerPC instruction set, these request types correspond to Load, Load Reply, and Store Instructions.

Request logic 106 is coupled to prioritizing logic 102, grant logic 110 and delay logic 108. Delay logic 108 receives a bus busy ("DBSY_") signal from the bus. This signal informs arbitration logic 10 that some other device is currently using the bus and the arbiter 10 must wait before it issues a grant signal to a requesting device. For the 6XX-MX bus, the data transfer size can be 1, 2, 4 or 8 beats long. The size of a beat depends on the bus size and transfer size. For 1 beat transfer, the total number of bytes is from 1 to 8 bytes. For 2 or more beats transfer, the total number of bytes is 8* (number of beats). The arbiter 10 always checks DBUSY_ before granting the bus. If DBUSY_ is active, then the next highest priority request will be granted 2 cycles from DBUSY_ becoming inactive. The duration of an active DBUSY_ is n−3 cycles long which means only a 4 or 8 beat transfer will use DBUSY_.

For multiple beat Data_Only cycle, DBUSY_ is driven active by the master 1 clock cycle after seeing DBG_ becoming active and stays active until 3 transferring beats left. This allows the arbiter 10 extra time to grant the bus to the next device without any dead cycle between masters.

Prioritizing logic 102 determines which of several requesting devices will have priority in obtaining a bus grant. The operation of prioritizing logic 102 will be described in greater detail herein.

Grant logic 110 provides signals to address grant logic 112 and data grant logic 114 which provide the data grant signals to the BUCs. There are two grant signals, the address bus grant ("ABG_") and the data bus grant ("DBG_"). These are also point-point signals from the arbiter 10 to the bus master. Data bus masters need only have DBG_.

An address bus grant signals to the bus master that it should start driving the address onto the address bus. The arbitration logic 10 then drives an early address transfer start signal ("EATS_") for one clock which tells the master to de-assert the address on the following clock, and the bus receivers to latch the address on the following clock. This operation is performed by EATS logic 116 of arbitration logic 10.

An Address-Only request cycle begins with the address bus master asserting the ABR_ signal. The arbiter 10 then asserts the ABG_ signal from address grant logic 112 for the requesting device which allows the device to obtain access to the bus. The arbiter 10 also causes EATS logic 116 to assert EATS_ on the next clock after ABG_ is asserted. The requesting device will drive the address on the bus 1 clock cycle after ABG_ and follows with a tri-state cycle. This allows an address grant every other clock cycle. This is described in greater detail with respect to FIG. 5A. FIG. 5A is a timing diagram showing the operation of the arbiter 10 responding to request signals from 2 devices A and B. In the first clock, device A asserts the ABR_ signal. In the second clock, arbiter 10 asserts the ABG_ signal to A, thus granting A the bus. In the third clock cycle, the arbiter asserts the EATS_ signal to device A causing A to drive the address onto the bus in clock cycle 4. Similarly, in cycle 3, B asserts the ABR_ signal and receives the ABG_ signal in cycle 4. The arbiter 10 drives the EATS_ signal to device B in cycle 5 and device B drives its address onto the bus in cycle 6.

The device, when requesting the address bus, pulses its ABR_ line for one clock cycle and waits until the ABG_ becomes active. During the waiting period, the device does not issue another address request unless an embodiment is provided which supports pipelined requests from devices.

A Data-Only cycle begins when the data bus master pulses its DBR_ line. If DBUSY_ is inactive and there is no device currently occupying the bus, then the arbiter 10 will grant the bus to the master. This is shown in greater in the timing diagram of FIG. 5B.

Figure 5C:
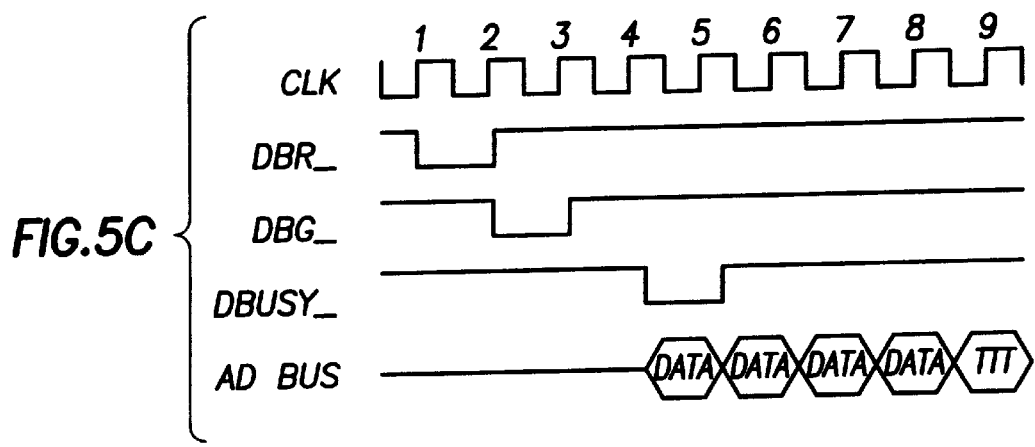

FIG. 5B is a timing diagram illustrating a single beat transfer in a data only cycle. In this case, there is only one requesting device. The requesting device asserts the data bus request signal in cycle 1. Arbiter 10 then asserts the data bus grant signal in cycle 2 after determining that DBUSY_ is unasserted. FIG. 5C is a timing diagram similar to that shown in FIG. 5B, but in this case, there is shown a multiple beat transfer.

An Address_Data cycle begins when the master pulses both its ABR_ and DBR_ signals. The cycle is similar to an Address-Only or Data_Only cycle. However, the arbiter 10 must make sure that there is no pending grant (DBUSY_ inactive) before granting the bus to the master. Typically, the master will drive the address on the bus for 1 cycle followed by one or more data cycles.

Figure 5D:
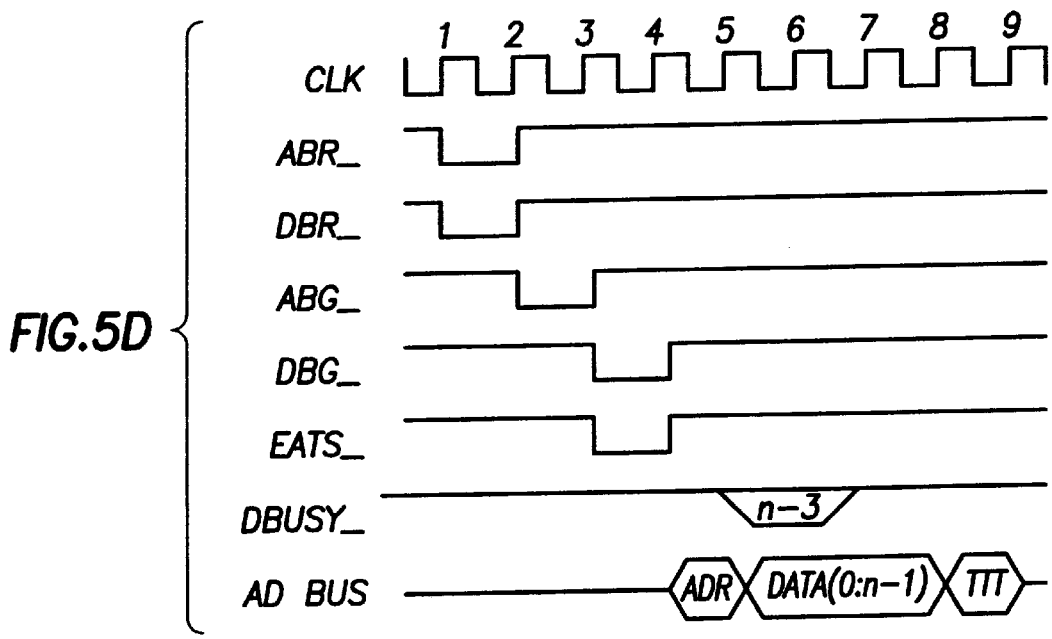

The arbitration logic 10 handles all bus requests from the bus unit controllers. Each BUC, depending on its implementation, is capable of requesting the address and/or the data bus. Any BUC can assert a request on any cycle, therefore there can often be more than one request asserted on any cycle. However, one address bus grant and/or one data bus grant can be issued at a time in this embodiment since the 6XX-MX bus is a multiplexed bus. This is shown in greater detail with respect to FIG. 5D. FIG. 5D is a timing diagram of an address-data cycle. In this case, the requesting device asserts both an address and a data bus request in clock 1. The address bus is granted in clock 2 and the EATS signal is generated by arbiter 10 in cycle 3. The data bus is granted to the requesting device in cycle 3 and the address and data transfers begin in cycle 4.

In one embodiment, the arbiter 10 operates on a fair priority scheme which is designed to give every BUC equal chance of getting access to the bus. The arbiter 10 keeps track of the previous user of the bus so it can make a decision on giving the bus to the next highest priority device. The next grant issued is based on the previous grant and present requests.

This arbitration scheme follows a set of rules. First, if a device is requesting the bus, and it has the highest priority, then the device will be granted the bus. For example, if device A has the highest priority and device A is requesting the bus, then the bus will be granted to device A. Second, if a device does not utilize its opportunity to obtain the bus, i.e., it did not issue a request, then the next highest priority device is the device logically adjacent, i.e., the neighbor, of the device having the highest priority. Third, if the current device is accessing the bus, then the adjacent device will be assigned the highest priority for the next grant. For example, if B is assigned the bus, then C becomes the highest priority the next time.

The above rules are explained in greater detail with respect to the table shown in FIG. 4. In this illustration, there are 5 devices which may access the bus. Each of the 5 devices is assigned a logical identifier, A-E, respectively. The adjacent, or neighboring, device for each of the devices, is the device which is the next logical device in the sequence. For example, for device A, its neighbor is B. For device B, its neighbor is C, and for device E, the neighbor is A. Referring now to the table shown in FIG. 4, it is seen that in request 400, there are 4 devices, A, B, C and D, which are simultaneously requesting the bus. The device with the highest priority is A. In this case, according to Rule 1, A will be granted control of the bus. The highest priority will then be assigned to device B. Thus, if device B is still requesting the bus on the next cycle, device B will be granted the bus. In request 402, it is seen that devices A, C and D are requesting the bus. In this example, device B has the highest priority. Since device B is not requesting the bus, the priority logic of the arbiter will perform a sequential search for the next device requesting the bus. In this case, C is the next device in the sequence requesting the bus and its bus request will be granted. The highest priority will then be assigned to the device logically adjacent to device C, i.e., device D.

In example 404, devices B and E are requesting the bus and device D is assigned the highest priority. Device D is not requesting the bus. Therefore, searching sequentially, beginning with the device immediately adjacent to device D, it is seen that E is requesting, and will be granted, the bus. The next highest priority will then be assigned to device A. In example 406, device D is requesting the bus and A is assigned the highest priority. The bus will be granted to device D and the next priority will be assigned to device E. Finally, in example 408, device E is requesting the bus and the highest priority is assigned to device A. Device E will be granted the bus, and A will be assigned the highest priority for the next cycle.

Figure 3:
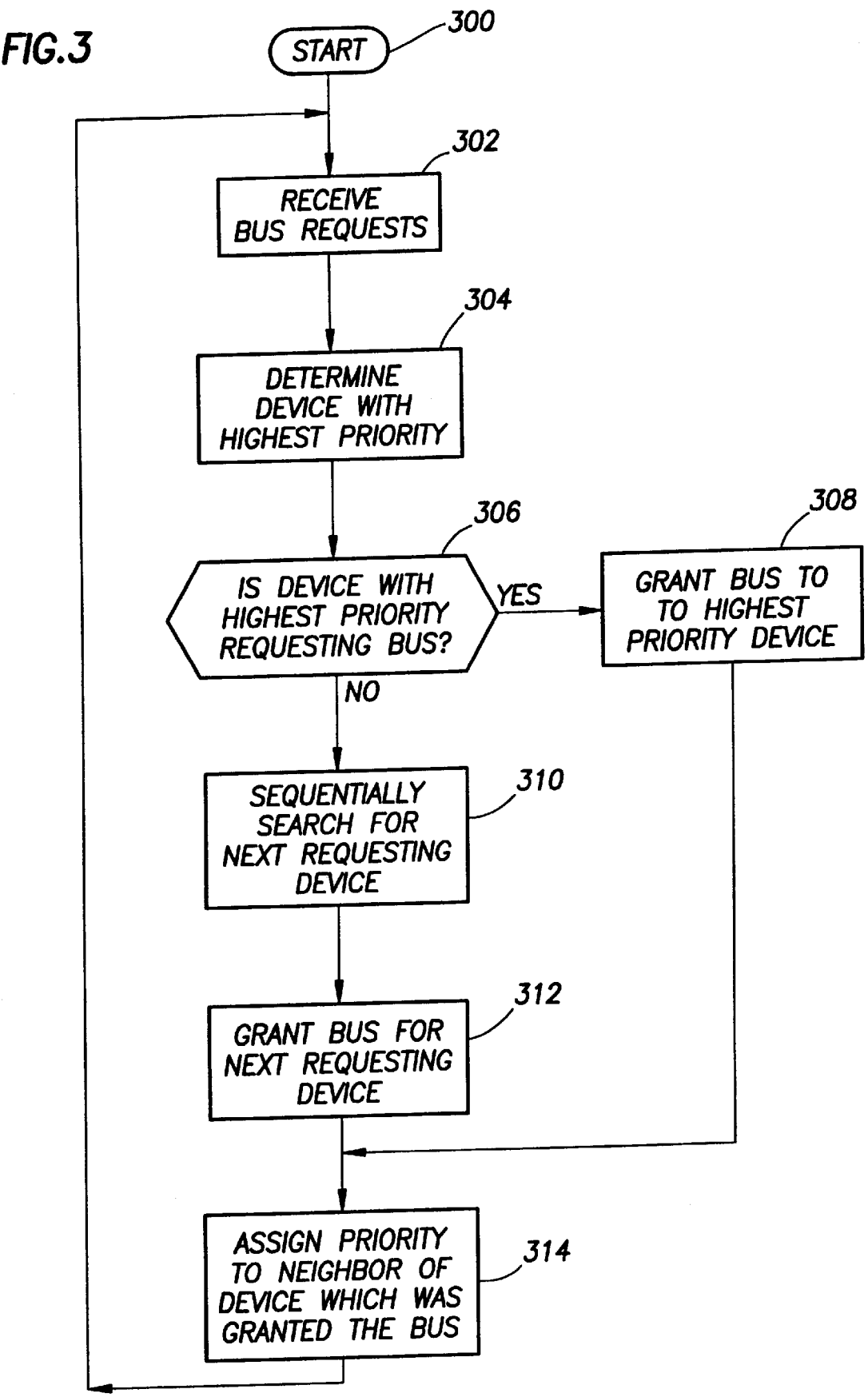
FIG. 3 is a flow chart illustrating the operation of an arbiter according to an embodiment of the invention.

FIG. 3 is a flow chart illustrating the arbitration according to an embodiment of the invention. In this case, the system starts at step 300 and proceeds to step 302 where it receives the bus request signals. In step 304, the arbiter determines which device has the highest priority. The arbiter then proceeds to step 306 where it determines whether the device having the highest priority is actually requesting the bus. If so, then the arbiter proceeds to step 308 and grants the bus to the highest priority device.

If the device with the highest priority is not requesting the bus, then the arbiter proceeds to step 310 where it sequentially searches for the next requesting device. The search begins with the device immediately adjacent to the device which is currently assigned the highest priority. When the next requesting device is found, the arbiter proceeds to step 312 and grants the bus to the next requesting device. In step 314, the arbiter then assigns priority for the next access to the neighbor of the device which was granted the bus in step 312. The system then proceeds back to the start to arbitrate the next cycle.

The present invention has been described with respect to the above embodiments which are presented by way of illustration and not limitation because variations in form and detail will be apparent to those of skill in the art without departing from the scope and spirit of the present invention. All publications described herein are hereby incorporated by reference as though set forth in full.

What is claimed is:

1. An apparatus for arbitrating simultaneous bus requests in a multiprocessor system having a plurality of devices which are coupled to a shared bus, the apparatus comprising:

means for receiving a plurality of bus requests from the devices;

means for determining a device having the highest priority;

means for determining whether the device having the highest priority is requesting the bus;

means for granting bus access to the device having the highest priority if the device having the highest priority is requesting the bus;

means for sequentially searching, beginning from the device logically adjacent to the device having the highest priority, for a next requesting device, and granting bus access to the next requesting device if the device having the highest priority is not requesting the bus;

means for assigning the highest priority to the device logically adjacent to the next requesting device.

2. An apparatus as in claim 1 wherein the means for receiving a plurality of bus requests comprises logic for receiving bus request signals generated by the devices.

3. An apparatus as in claim 1 wherein the means for determining a device having the highest priority comprises priority logic which stores the logical identification of the device which accessed the bus immediately prior to the current request.

4. An apparatus as in claim 1 wherein the bus comprises an address bus and a data bus.

5. An apparatus as in claim 4 wherein the means for granting bus access comprises grant logic for separately granting access to the address bus and the data bus.

6. A method for arbitrating simultaneous bus requests in a multiprocessor system having a plurality of devices which are coupled to a shared bus, the method comprising:

receiving a plurality of bus requests from the devices;

determining a device having the highest priority;

determining whether the device having the highest priority is requesting the bus;

granting bus access to the device having the highest priority if the device having the highest priority is requesting the bus;

sequentially searching, beginning from the device logically adjacent to the device having the highest priority, for a next requesting device, and granting bus access to the next requesting device if the device having the highest priority is not requesting the bus;

assigning the highest priority to the device logically adjacent to the next requesting device.

7. A method as in claim 6 wherein the step of receiving a plurality of bus requests comprises receiving bus request signals generated by the devices.

8. A method as in claim 6 wherein the step of determining a device having the highest priority comprises storing the logical identification of the device which accessed the bus immediately prior to the current request.

9. A method as in claim 6 wherein the bus comprises an address bus and a data bus.

10. A method as in claim 9 wherein the step of granting bus access comprises separately granting access to the address bus and the data bus.

* * * * *